United States Patent
Silvery et al.

(10) Patent No.: US 12,095,313 B2
(45) Date of Patent: Sep. 17, 2024

(54) SENSOR FASTENING DEVICE FOR TEMPERATURE MEASUREMENT IN AN ELECTRICAL MACHINE OF A MOTOR VEHICLE

(71) Applicant: Schaeffler Technologies AG & Co. KG, Herzogenaurach (DE)

(72) Inventors: Christian Silvery, Walzbachtal (DE); Matthias Kästle, Lauf (DE); Marie-Luise Anke, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 401 days.

(21) Appl. No.: 17/640,902

(22) PCT Filed: Jul. 2, 2020

(86) PCT No.: PCT/DE2020/100583
§ 371 (c)(1),
(2) Date: Mar. 7, 2022

(87) PCT Pub. No.: WO2021/047711
PCT Pub. Date: Mar. 18, 2021

(65) Prior Publication Data
US 2022/0337132 A1 Oct. 20, 2022

(30) Foreign Application Priority Data
Sep. 9, 2019 (DE) .................... 10 2019 124 097.7

(51) Int. Cl.
*H02K 11/25* (2016.01)
*G01K 1/14* (2021.01)
*H02K 3/34* (2006.01)

(52) U.S. Cl.
CPC ............... *H02K 11/25* (2016.01); *G01K 1/14* (2013.01); *H02K 3/345* (2013.01)

(58) Field of Classification Search
CPC .............................. H02K 11/25; H02K 3/345
See application file for complete search history.

(56) References Cited

U.S. PATENT DOCUMENTS

| | | | | |
|---|---|---|---|---|
| 2022/0200410 A1* | 6/2022 | Silvery | .................. | H02K 11/25 |
| 2022/0263387 A1* | 8/2022 | Silvery | .................. | H02K 11/25 |
| 2022/0302799 A1* | 9/2022 | Silvery | ................ | H01R 25/162 |

FOREIGN PATENT DOCUMENTS

| | | |
|---|---|---|
| CN | 207426915 U | 5/2018 |
| DE | 102013201834 A1 | 8/2014 |

(Continued)

*Primary Examiner* — Jeremy A Luks

(57) ABSTRACT

A sensor fastening device for temperature measurement in an electrical machine for driving a motor vehicle having a retaining body for receiving a temperature sensor, a support body for resting against a stator lamination of the electrical machine, the support body being connected to the retaining body spreadably, and a spreading element for spreading the retaining body away from the support body. By means of the sensor fastening device, which can be shifted in the radial direction and can be moved past the winding axially, the temperature sensor can be positioned, from the radial outside, on the radially inner edge of the winding and can be thermally coupled by means of the spreading element such that maintenance-friendly and accurate measurement of a maximum temperature in a winding of an electrical machine for a motor vehicle is made possible.

10 Claims, 4 Drawing Sheets

(56) References Cited

FOREIGN PATENT DOCUMENTS

| | | |
|---|---|---|
| DE | 102016209459 A1 | 11/2017 |
| DE | 102016211536 A1 | 12/2017 |
| DE | 102018206985 A1 | 2/2019 |
| JP | 2003092858 A | 3/2003 |
| JP | 2004297958 A | 10/2004 |
| JP | 3699025 B2 | 9/2005 |
| WO | WO-2009093758 A1 * | 7/2009 ........... G01D 11/245 |
| WO | WO-2010143729 A1 * | 12/2010 ............... G01K 1/14 |
| WO | WO-2018162247 A1 * | 9/2018 ............. G01K 1/146 |

* cited by examiner

SENSOR FASTENING DEVICE FOR TEMPERATURE MEASUREMENT IN AN ELECTRICAL MACHINE OF A MOTOR VEHICLE

CROSS-REFERENCE TO RELATED APPLICATIONS

This application is the U.S. National Phase of PCT Appln. No. PCT/DE2020/100583 filed Jul. 2, 2020, which claims priority to DE 10 2019 124 097.2 filed Sep. 9, 2019, the entire disclosures of which are incorporated by reference herein.

TECHNICAL FIELD

The disclosure relates to a sensor fastening device, by means of which a temperature sensor can be fastened in an electrical machine of a motor vehicle in order to measure a temperature occurring in the electrical machine.

BACKGROUND

Temperature sensors are used in electrical machines, for example, to monitor the temperature of individual components. Particularly in electrical machines used for driving a motor vehicle, temperatures of stator and rotor components have to be monitored. In electrical machines with distributed windings, but also in machines with single-tooth windings, the temperature sensors are usually installed inside the stator, where they are, however, no longer accessible from the outside for maintenance purposes. For electrical machines, especially for electric hybrid vehicles as well as for electric vehicles or for wheel hub drives, different winding technologies for the stator of the electrical machines are known. For a particularly dense or compact winding, for example, winding technologies such as the so-called hairpin or bar wave winding are used. It is difficult to measure the temperature of such windings because they are very tightly wound or assembled, so that no temperature sensor can be inserted between the wires of the respective winding in order to measure the temperature of the winding. In this case, the temperature of the winding is measured at the radial outer side, where, however, lower temperatures occur than on the radial inner edge of the winding, so that a too low maximum temperature of the winding is measured.

SUMMARY

It is the object of the disclosure to disclose measures that enable easy maintenance and accurate measurement of a maximum temperature in a winding of an electrical machine for a motor vehicle.

According to the disclosure, the object is achieved by a sensor fastening device having the features described herein. Preferred embodiments of the disclosure are described herein, each of which can either individually or in combination represent an aspect of the disclosure.

According to the disclosure, a sensor fastening device for temperature measurement in an electrical machine for driving a motor vehicle is provided, comprising a retaining body for receiving a temperature sensor, a support body for resting against a stator lamination of the electrical machine, the support body being connected to the retaining body spreadably, in particular substantially jointedly, and a spreading element for spreading the retaining body away from the support body.

With the aid of the sensor fastening device, the temperature sensor can be guided in the axial direction past the winding to be monitored, so that it is possible to insert the sensor fastening device into the electrical machine from the radial outside and to remove the temperature sensor again from the radial outside for maintenance purposes without the winding being able to block a radial relative movement of the temperature sensor. An impact of the temperature sensor on the winding in the radial direction can be avoided. After positioning the sensor fastening device in the intended end position relative to the winding of the electrical machine, the spreading element can be inserted into a receiving gap formed between the retaining body and the support body, allowing the retaining body to be spread away from the support body. For this purpose, for example, the spreading element can slide along an inclined plane, which increases the extension of the area between the spreading element and the support body and/or the retaining body. Particularly preferably, the spreading element is received between the retaining body and the support body in a self-locking manner, for example wedged. By spreading the sensor fastening device, the retaining body can be preloaded together with the temperature sensor in the axial direction of the electrical machine. For this purpose, the support body can be supported above the temperature sensor on the winding and the support body can be supported on an upper side of a stator lamination of the stator of the electrical machine, which extends axially next to the winding in a radial plane. The spreading element can thus press the retaining body together with the temperature sensor away from the stator lamination towards the winding. Before the spreading element is fully inserted, the sensor fastening device has such a small extension in the axial direction of the electrical machine that the sensor fastening device, together with the temperature sensor, can easily be moved axially past the winding from the radial outside. When the desired radial relative position to the winding has been achieved, the spreading element can be inserted to such an extent that the spread sensor fastening device can press the temperature sensor against the winding with a spring force. In this case, the temperature sensor can be pressed in particular against the radially inner edge of the winding, where the highest temperatures are to be expected. Between the axial edge of the winding, against which the temperature sensor is pressed, and an inner wire region of the winding which is central in the axial direction, a heat transfer, which is essentially dominated only by thermal conduction, occurs and which can either be taken into account by calculation in the temperature measurement in a monitoring unit connected to the temperature sensor or can even be neglected. Here, the knowledge can be exploited that the sensor fastening device is usually made of an electrically insulating plastic material that can be bent somewhat elastically in the axial direction of the electrical machine by the force applied by the spreading element to ensure thermal contact of the temperature sensor with the radially inner edge of the winding. By means of the sensor fastening device, which can be shifted in the radial direction and can be moved past the winding axially, the temperature sensor can be positioned, from the radial outside, on the radially inner edge of the winding and can be thermally coupled by means of the spreading element such that maintenance-friendly and accurate measurement of a maximum temperature in a winding of an electrical machine for a motor vehicle is made possible.

In particular, the electrical machine is designed in to feed a drive power into a drive train of the motor vehicle for driving a motor vehicle in motor operation or to drive an individual wheel of the motor vehicle as part of a wheel hub drive. In a generator operation of the electrical machine, drag torques acting on the electrical machine can be used to generate electrical energy. The electrical machine has a stationary stator and a rotor rotating relative to the stator. The rotor can have permanent magnets that can electromagnetically interact with electromagnets of the stator to exchange torque during motor operation and/or generator operation. The stator can have at least one stator lamination covering the winding of the stator on one axial side. The winding can be electrically insulated from the stator lamination by insulation elements. In particular, the sensor fastening device can be inserted in an intermediate space formed between the stator lamination and the winding in an insulation layer containing the insulation elements. In particular, the winding is based on a coil winding technology that allows for high power density and high energy efficiency. Preferably, the winding is based on a hairpin or bar wave winding. In the case of bar wave winding, the winding, in particular distributed winding, can be created in a kind of braiding process and then joined in the stator slots. This makes it possible to work with smaller cross sections, to increase the possible number of slots and/or to reduce the effect of current displacement losses. A final assembly position of the sensor fastening device corresponds in particular to a relative position of the sensor fastening device within the electrical machine in which the sensor fastening device is to be installed together with the temperature sensor, in which the temperature sensor is aligned essentially in the radial direction of the electrical machine and rests in its designated final position against the winding, in particular against the radially inner edge of the winding.

In particular, the retaining body and the support body are integrally made of a bendable plastic material. The elasticity of the plastic material alone can be used for jointedly spreading the sensor fastening device. As a result, it is not necessary to design the retaining body and the support body as separate components that first have to be jointedly and/or pivotally connected to one another during manufacture. The formation of a joint or hinge can thus be dispensed with. Instead, the sensor fastening device can be produced inexpensively by plastic injection molding. The retaining body and the support body can be integrally connected to one another via a central web bridging the receiving gap formed between the retaining body and the support body for the spreading element and serving as a connecting wall, wherein the wall thickness of the central web is in particular dimensioned in such a way that elastic bending of the central web over the expected spreading of the sensor fastening device is allowed for without breaking or being permanently plastically deformed.

Preferably, the retaining body and the support body are connected to one another via a central web, wherein the central web has an opening for inserting the spreading element. The central web, which faces radially outward, particularly in the assembly position, can receive the spreading element via the opening and allow the spreading element to enter the receiving gap formed between the retaining body and the support body. This allows the spreading element to spread the sensor fastening device spaced apart from the central web so that the temperature sensor in particular can be pressed against the radially inner edge of the winding. Preferably, the spreading element has a collar that can abut the material of the central web forming the opening of the central web to limit the insertion depth of the spreading element. This avoids excessive spreading of the sensor fastening device, which could plastically deform and/or damage the central web.

Particularly preferably, a receiving gap for receiving the spreading element is formed between the retaining body and the support body, wherein in particular the receiving gap is formed to be substantially conical at least in a partial region. When the spreading element, which is preferably also designed to be conical, arrives in the tapering part of the conical receiving gap, the sensor fastening device can be automatically spread by the spreading element sliding along the inclined plane formed by the conical design of the receiving gap, in particular with a corresponding inclined plane, and spreading the sensor fastening device.

In particular, the spreading element is designed as a plug-in dowel which can be inserted between the retaining body and the support body, wherein in particular the plug-in dowel has barbs which can be spread away by screwing in a dowel screw. As a result, the spreading element may already have conical sub-regions which are present from the outset and/or are only created and/or reinforced by screwing in the dowel screw. Comparable to an expansion dowel, the spreading element can spread itself with the help of the dowel screw and thus cause the sensor fastening device to spread. This makes it possible, in particular, to insert the spreading element into the receiving gap in a pre-assembled state, wherein the spreading element can be frictionally retained in the receiving gap. In this case, the actual spreading does not begin until the dowel screw, which is preferably pre-assembled in a partially screwed in state, is tightened.

Preferably, retaining recesses are formed between the retaining body and the support body for receiving barbs of the spreading element in a form-fitting manner which can be spread away and/or can be produced by pressing on the barbs. The barbs of the spreading element can be retained by the respective associated retaining recess in a form-fitting and captive manner, so that unintentional release of the spreading element can be reliably avoided.

Particularly preferably, the support body has at least one limiting stop for radial abutment against an insulation element provided between a winding and a stator lamination and/or at least one retaining clip for radial engagement behind the insulation element. In particular, the sensor fastening device is provided between two essentially radially extending insulation elements positioned spaced apart from one another in the circumferential direction, so that a limiting stop can abut against each of the two insulation elements and/or both insulation elements can be embraced by a retaining clip in each case. The radial relative position of the sensor fastening device relative to the winding can thus be easily specified without having to provide a fastening means at the radially outer edge of the stator lamination. In particular, the respective insulation element is accommodated between the limiting stop and the retaining clip with as little play as possible, so that the temperature element can be pressed against the designated measuring position of the winding with sufficient accuracy.

In particular, the spreading element has a protruding disassembly arm fore pulling the spreading element out of a receiving gap formed between the retaining body and the support body. The disassembly atm projecting substantially transversely from the longitudinal direction of the spreading element outside the receiving gap can be held between thumb and forefinger, for example, in order to pull out the spreading element, if necessary after a dowel screw has been loosened. The spreading of the sensor fastening device can thus be reversed so that the temperature sensor is no longer pressed against the winding. In this state, the temperature sensor can be easily pulled out of the retaining body in the radial direction of the electrical machine, for example to replace a defective temperature sensor with little maintenance effort.

Preferably, the retaining, body has a receiving shaft for inserting the temperature sensor by means of a relative movement in the radial direction of the electrical machine. By means of the receiving shaft, the temperature sensor can be easily inserted into the sensor fastening device, wherein the receiving shaft can in particular block a relative movement of the temperature sensor relative to the sensor fastening device in the axial and tangential direction of the electrical machine. Particularly preferably, the receiving shaft has a retaining pocket for receiving a free end of the temperature sensor, wherein in particular the retaining pocket blocks a relative movement of the temperature sensor to the retaining body in the axial and/or tangential direction of the electrical machine. In particular, the free end of the temperature sensor is wedged in the retaining pocket. This minimizes the play of the temperature sensor in the receiving shaft. The free end of the temperature sensor inserted in the retaining pocket can reliably prevent the temperature sensor from being levered out of the receiving shaft even under load.

The disclosure further relates to a stator arrangement for an electrical machine having at least one stator lamination, a winding for forming an electromagnet, insulation elements provided between the stator lamination and the winding and arranged spaced apart from one another in the circumferential direction for electrically insulating the winding with respect to the stator lamination, and a sensor fastening device clamped between the stator lamination and the winding, which can be designed and further developed as described above, wherein the temperature sensor received in the retaining body extends substantially radially between two insulation elements following one another in the circumferential direction and is pressed in a thermally conductive manner against the winding, in particular a radially inner edge of the winding, by the spreading element. By means of the sensor fastening device, which can be shifted in the radial direction and can be moved past the winding axially, the temperature sensor can be positioned, from the radial outside, on the radially inner edge of the winding and can be thermally coupled by means of the spreading element such that maintenance-friendly and accurate measurement of a maximum temperature in a winding of an electrical machine for a motor vehicle is made possible.

Particularly preferably, the sensor fastening device is fastened to at least one insulation element in a form-fitting manner, in particular in a manner suitable to prevent loss in the radial direction of the electrical machine. The radial relative position of the sensor fastening device relative to the winding can thus be easily specified without having to provide a fastening means at the radially outer edge of the stator lamination. In particular, the respective insulation element engages in the sensor fastening device with as little play as possible in the radial direction so that the temperature element can be pressed against the designated measuring position of the winding with sufficient accuracy. When the spreading of the sensor fastening device is reversed, the temperature sensor can be easily pulled out of the retaining body in the radial direction of the electrical machine, for example to replace a defective temperature sensor with little maintenance effort.

BRIEF DESCRIPTION OF THE DRAWINGS

In the following, the disclosure is explained by way of example with reference to the accompanying drawings using preferred exemplary embodiments, wherein the features shown below can represent an aspect of the disclosure both individually and in combination. In the figures.

DETAILED DESCRIPTION

Figure 1:
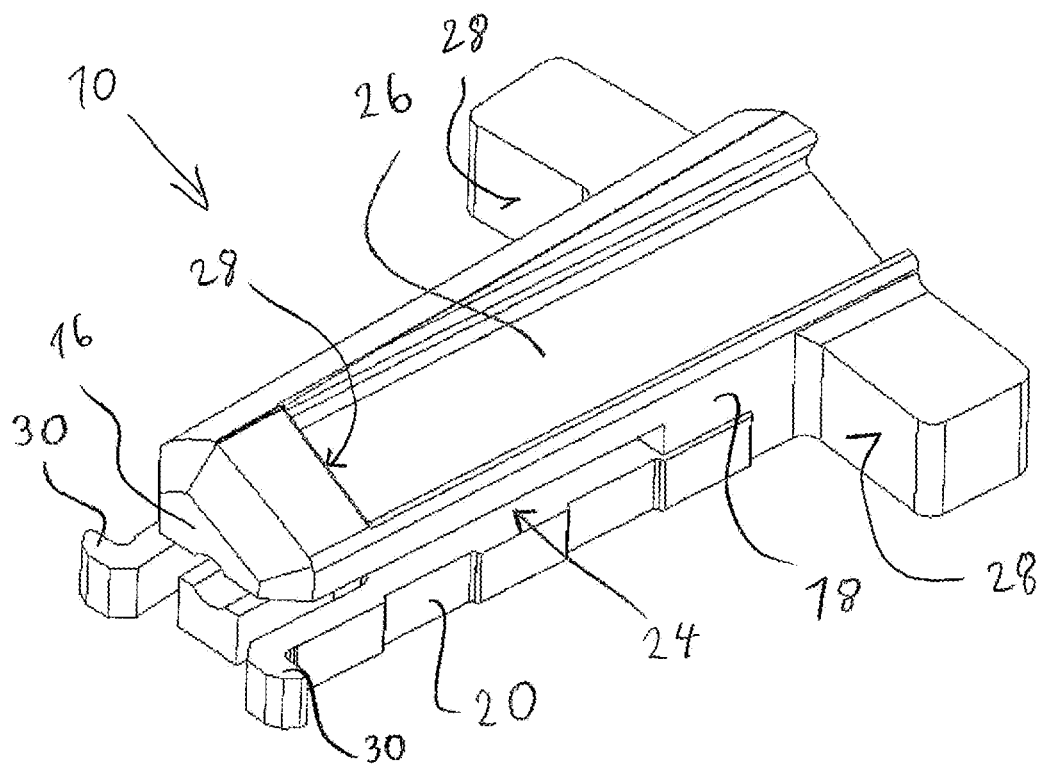
FIG. 1: shows a schematic perspective front view of a sensor fastening device.
Figure 2:
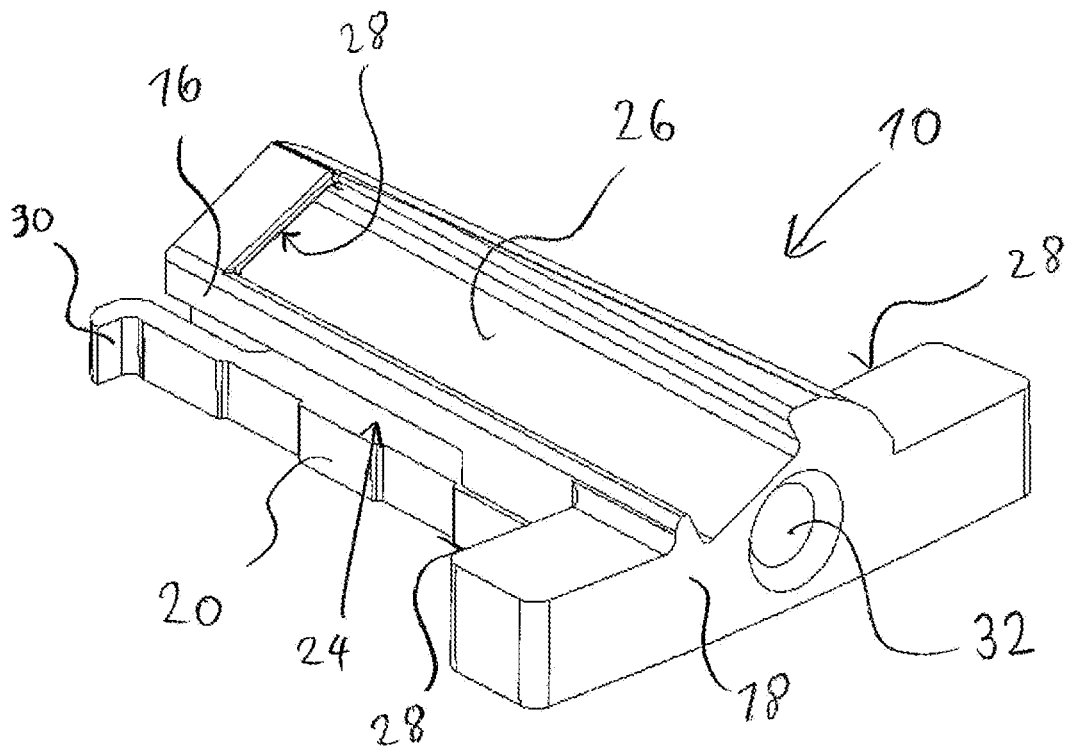
FIG. 2: shows a schematic perspective rear view of the sensor fastening device of FIG. 1, FIG. 3: shows a schematic sectional view of the sensor fastening device of FIG. 1, FIG. 4: shows a schematic perspective rear view of the sensor fastening device of FIG. 2 before assembly.

The sensor fastening device 10 shown in FIG. 1 and FIG. 2 can be used for fastening a temperature sensor 12, in particular designed as an NTC or PTC resistor element, in an electrical machine provided for driving a motor vehicle in order to be able to monitor the temperature of a winding 14 of electromagnets of a stator of the electrical machine. The sensor fastening device 10 has a retaining body 16 and a support body 20 integrally connected via a central web 18. The support body 20 can rest flat on a stator lamination 20 of a stator of the electrical machine. The retaining body 16 is formed separately above the support body 20 in the axial direction via a receiving gap 24. The retaining body 18 forms a receiving shaft 26 into which the temperature sensor 12 can be inserted in the longitudinal direction and which at the same time blocks a relative movement of the temperature sensor 12 transversely to the longitudinal direction in a form-fitting manner. When the sensor fastening device 10 is oriented with its longitudinal direction in the radial direction of the electrical machine, relative movement of the temperature sensor 12 in the tangential and axial directions of the electrical machine is blocked. A radially inwardly facing free end of the temperature sensor 12 can be inserted, preferably wedged, into a retaining pocket 28 formed at the end of the receiving shaft 26. In the region of the central web 18, limiting stops 28 protrude from the support body 20. Retaining clips 30 protrude from the end of the support body 20 facing away from the central web 18.

Figure 3:
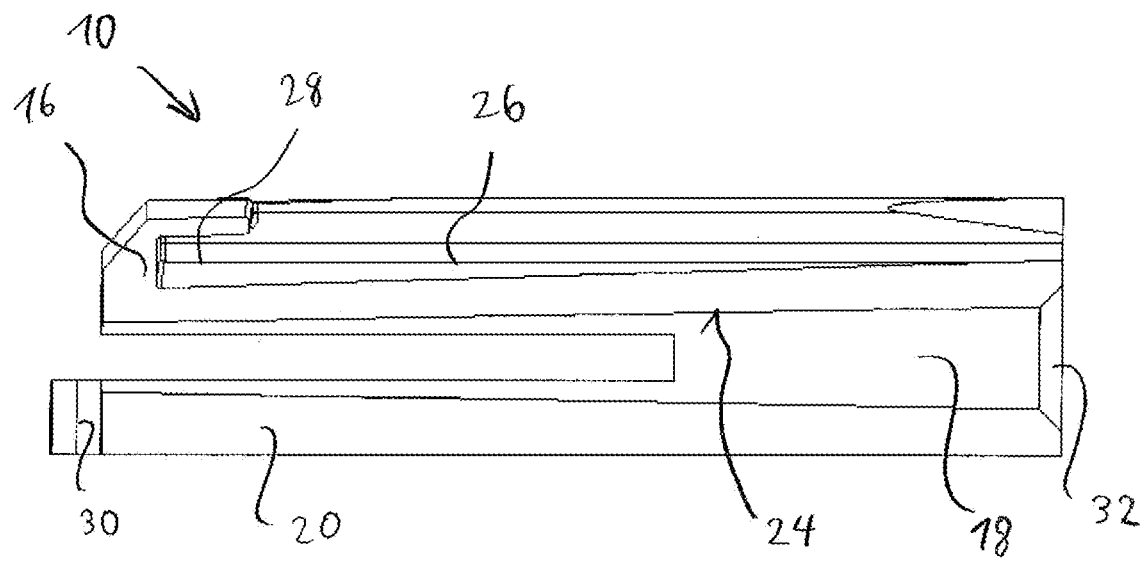

As shown in FIG. 3, an opening 32 is provided in the central web 18, which communicates with the receiving gap 24. The receiving gap 24 is substantially conical in shape and tapers along its longitudinal direction away from the central web 18.

Figure 4:
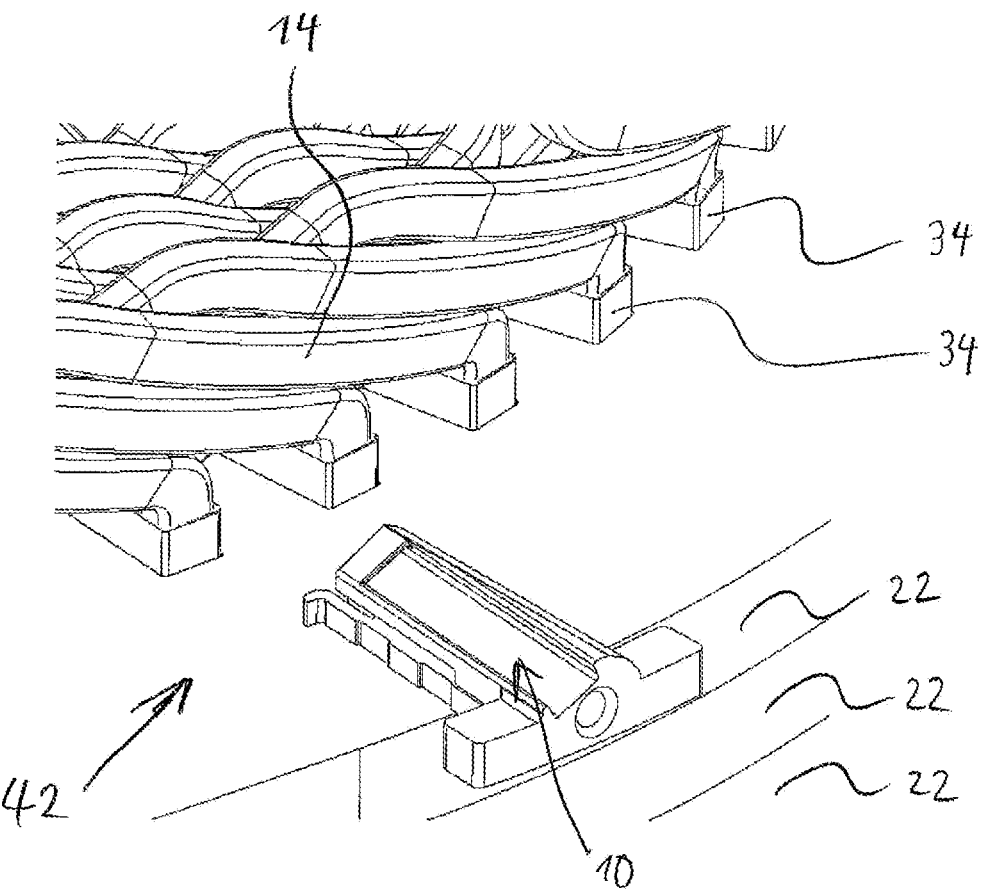
Figure 5:
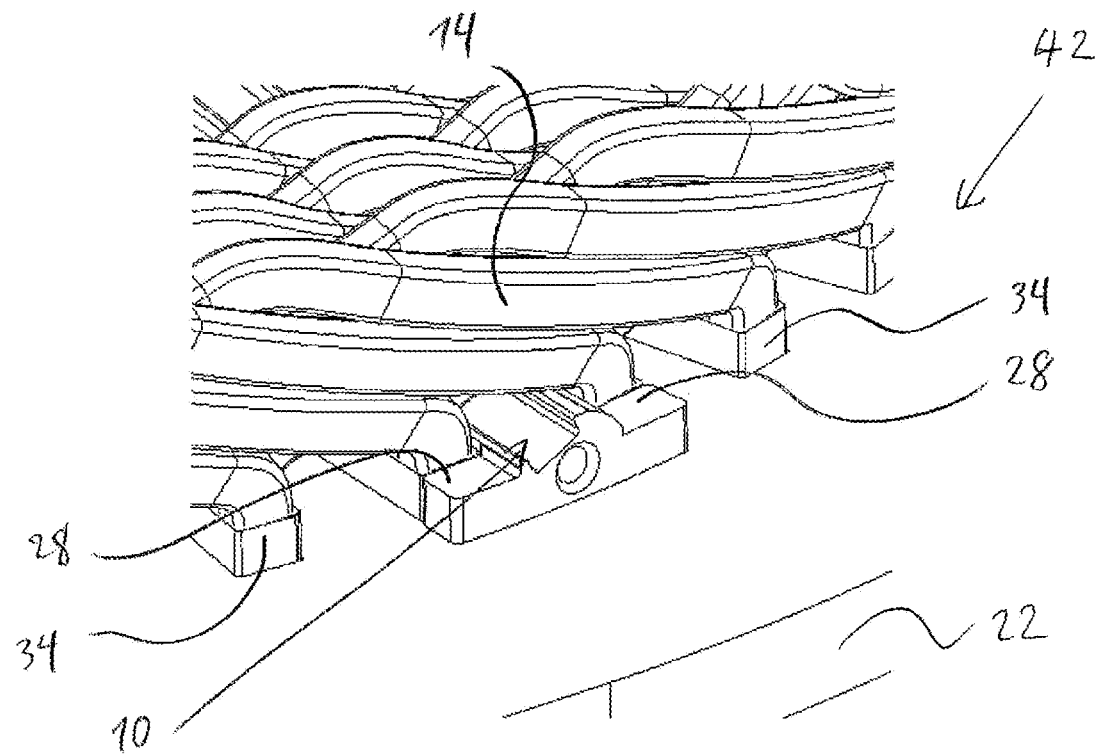
FIG. 5: shows a schematic perspective rear view of the sensor fastening device of FIG. 4 after assembly.
Figure 6:
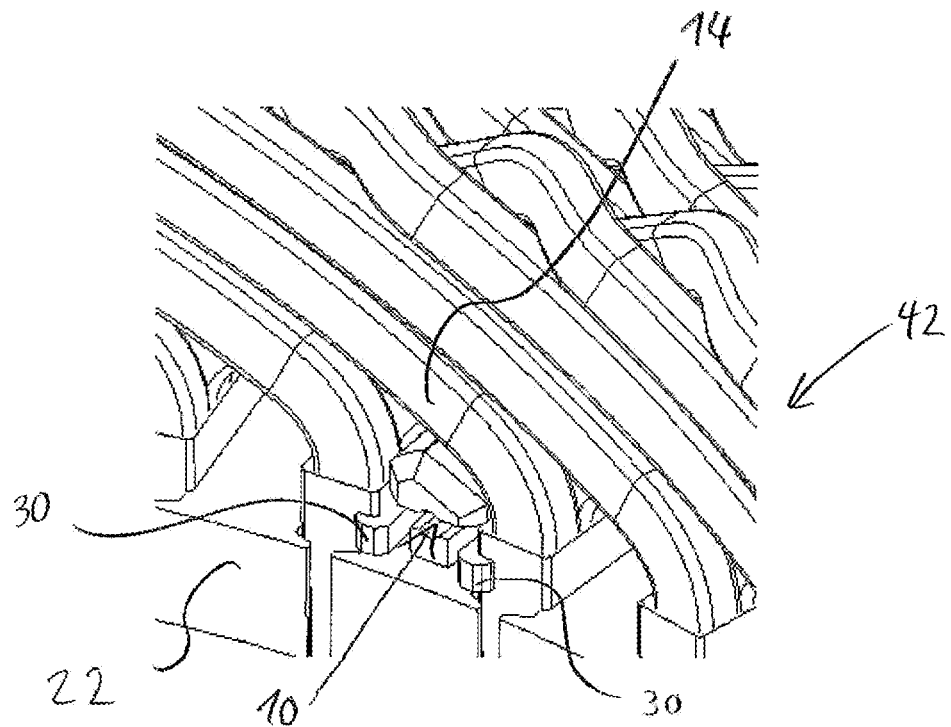
FIG. 6: shows a schematic perspective front view of the sensor fastening device of FIG. 1 after assembly.

As shown in FIG. 4, when mounted in an electrical machine, the sensor fastening device 10 can be substantially radially oriented and inserted along a surface of the stator lamination 22 into a space between two circumferentially following and substantially radially oriented insulation elements 34. The insertion depth of the sensor fastening device 10 can be limited by the limiting stops 28 radially abutting the insulation elements 34, as shown in FIG. 5. At the same time, the sensor fastening device 10 is clipped to the insulation elements 34 at the radially inner end of the insulation elements 34 via the retaining clips 30, as shown in FIG. 6. Subsequently, the temperature sensor 12 can be plugged into the sensor fastening device 10 if the temperature sensor 12 was not already pre-assembled in the sensor fastening device 10 during the clipping of the sensor fastening device 10.

Figure 7:
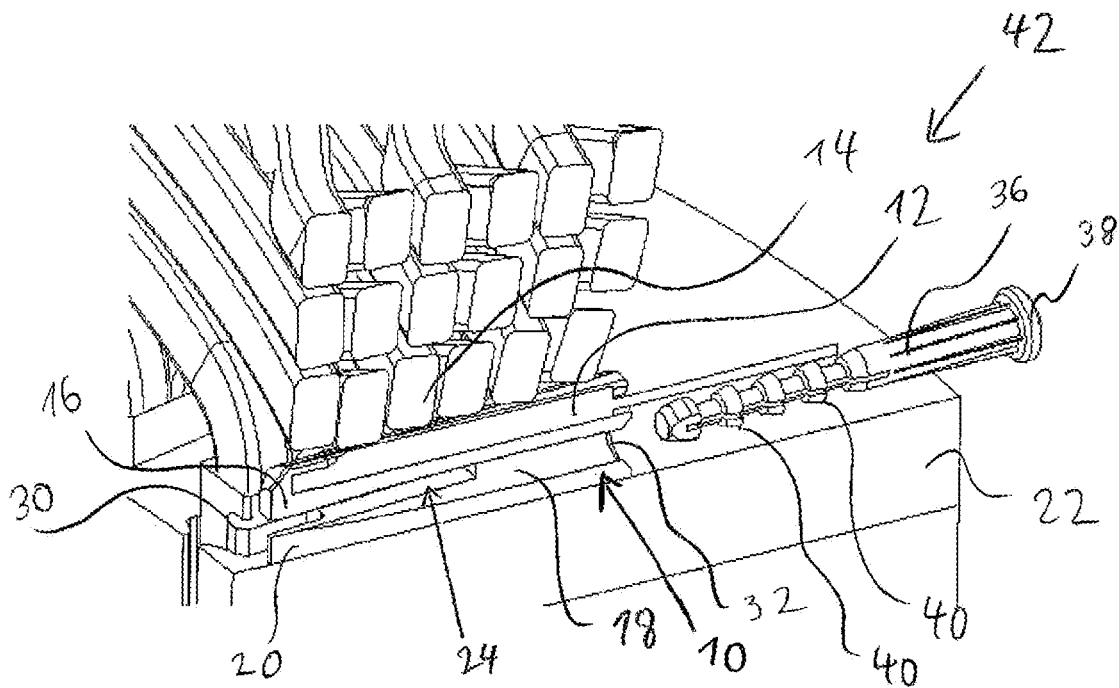
FIG. 7: shows a schematic perspective sectional view of the sensor fastening device of FIG. 5 and FIG. 6 before insertion of a spreading element.
Figure 8:
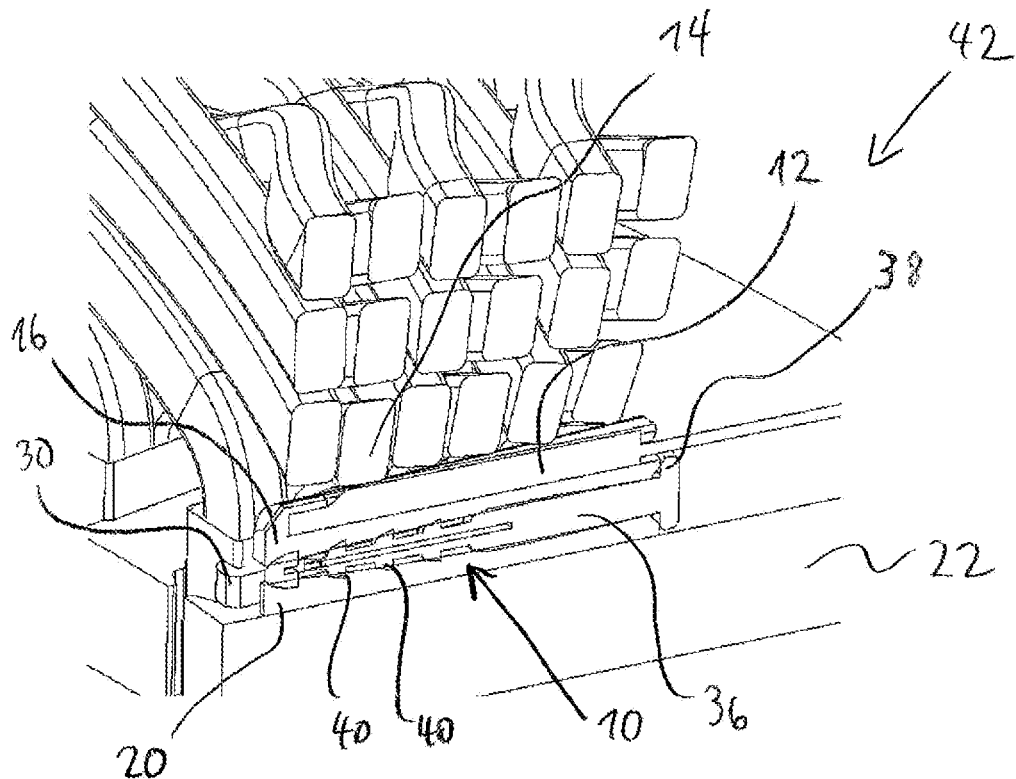
FIG. 8: shows a schematic perspective sectional view of the sensor fastening device of FIG. 7 after insertion of the spreading element.

As shown in FIG. 7, a spreading element 36 configured as a spreadable plug-in dowel can be inserted into the receiving gap 24 via the opening 32 of the central web web 18 until a protruding collar 38 of the spreading element 36 abuts the central web 18 and limits the insertion depth of the spreading element 36. Preferably, the spreading element is wedged in the receiving gap and/or received captively via barbs 40 of the spreading element 36 engaging in undercut retaining recesses of the receiving gap 24, as shown in FIG. 8. Here, it is generally possible that the spreading element 36 inserted into the receiving gap 24 has bent the retaining body of the sensor fastening device 10 away from the support body 20 to such an extent that, when the sensor fastening device 10 is in the spread state, the temperature sensor 12 presses the temperature sensor 12 against the winding 14. This results in a thermal connection between the temperature sensor 12 and the winding 14, which is not affected by an intermediate thermal insulation layer in between. If this is not yet the case and/or the contact pressure of the temperature sensor 12 is to be increased, in particular at the radially inner edge of the winding 14, a dowel screw can be screwed into the spreading element 36 designed as a dowel, which further spreads the spreading element 36 and thereby also the sensor fastening device 10. At the same time, this wedges the sensor fastening device 10 between the stator lamination 22 and the winding 14. In addition, the temperature sensor 12 is protected from other media in the intermediate space between the insulation elements and between the winding 14 and the stator lamination 22, so that, for example, impairment of the temperature measurement by forced convective heat dissipation is avoided. The stator of the electrical machine, composed of the winding 14, the insulation elements 34 and the stator laminations 22, together with the sensor fastening device 10 and the temperature sensor 12, form a stator assembly 42 which can act together as a common assembly with a rotor of the electrical machine, which is not shown. Here, the temperature sensor 12 can very easily be disassembled for maintenance purposes, for example to replace a defective temperature sensor 12.

LIST OF REFERENCE SYMBOLS

10 Sensor fastening device
12 Temperature sensor
14 Winding
16 Retaining body
18 Central web
20 Support body
22 Stator lamination
24 Receiving gap
26 Receiving shaft
28 Limiting stop
30 Retaining clip
32 Opening
34 insulation elements
36 Spreading element
38 Collar
40 Barbs
42 Stator arrangement

The invention claimed is:

1. A sensor fastening device for temperature measurement in an electrical machine for driving a motor vehicle, the sensor fastening device comprising: a retaining body configured for receiving a temperature sensor, a support body configured for resting against a stator lamination of the electrical machine, wherein the support body is spreadably connected to the retaining body, a spreading element configured for spreading the retaining body away from the support body, wherein the spreading element is designed as a plug-in dowel which can be inserted between the retaining body and the support body, and wherein the plug-in dowel has barbs which can be spread away by screwing in a dowel screw.

2. The sensor fastening device according to claim 1, wherein the retaining body and the support body are integrally made of a bendable plastic material.

3. The sensor fastening device according to claim 1, wherein the retaining body and the support body are connected to one another via a central web, wherein the central web has an opening for inserting the spreading element.

4. The sensor fastening device according to claim 1, wherein a receiving gap for receiving the spreading element is formed between the retaining body and the support body.

5. The sensor fastening device according to claim 1, wherein retaining recesses are formed between the retaining body and the support body for receiving the barbs of the spreading element in a form-fitting manner which can be spread away or can be produced by pressing on the barbs.

6. The sensor fastening device according to claim 1, wherein the support body has at least one limiting stop for radial abutment against an insulation element provided between a winding and a stator lamination and at least one retaining clip for radial engagement behind the insulation element.

7. The sensor fastening device according to claim 1, wherein the spreading element comprises a protruding disassembly arm configured for pulling the spreading element out of a receiving gap formed between the retaining body and the support body.

8. A stator arrangement for an electrical machine having at least one stator lamination, a winding for forming an electromagnet, insulation elements provided between the stator lamination and the winding and arranged spaced apart from one another in a circumferential direction for electrically insulating the winding with respect to the stator lamination, and a sensor fastening device clamped between the stator lamination and the winding, according to claim 1, wherein the temperature sensor received in the retaining body extends substantially radially between two insulation elements following one another in the circumferential direction and is pressed in a thermally conductive manner against the winding by the spreading element.

9. The stator arrangement according to claim 8, wherein the sensor fastening device is fastened to at least one insulation element in a form-fitting manner.

10. The sensor fastening device according to claim 4, wherein the receiving gap is formed to be substantially conical at least in a partial region.

* * * * *